(12) United States Patent
Choi et al.

(10) Patent No.: US 7,593,146 B2
(45) Date of Patent: Sep. 22, 2009

(54) IMAGE SCANNING DEVICE WITH CLEANING UNIT

(75) Inventors: Dong-Ha Choi, Suwon-si (KR); Byung-Sun Ahn, Suwon-si (KR); Ho-Ill Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 498 days.

(21) Appl. No.: 11/320,317

(22) Filed: Dec. 29, 2005

(65) Prior Publication Data

US 2006/0158698 A1 Jul. 20, 2006

(30) Foreign Application Priority Data

Jan. 17, 2005 (KR) .................. 10-2005-0004132

(51) Int. Cl.
*H04N 1/04* (2006.01)
(52) U.S. Cl. ............. 358/497; 358/474; 358/471; 358/483
(58) Field of Classification Search .......... 358/497, 358/474, 471, 483, 482, 487, 296, 473, 505, 358/506, 512–514; 250/239, 208.1, 216, 250/234–236; 399/211, 212, 11, 379; 347/108, 347/222, 263
See application file for complete search history.

(56) References Cited

U.S. PATENT DOCUMENTS

| 5,635,973 | A | * | 6/1997 | Yamada | .................. 347/171 |
| 5,812,172 | A | * | 9/1998 | Yamada | .................. 347/171 |
| 2002/0149804 | A1 | * | 10/2002 | Mick et al. | .................. 358/474 |

FOREIGN PATENT DOCUMENTS

| JP | 62-127851 | | 6/1987 |
| JP | 04-001673 | | 1/1992 |
| JP | 05-042747 | | 2/1993 |
| JP | 07-069488 | | 3/1995 |
| JP | 11109726 A | * | 4/1999 |
| KR | 99-020077 | | 3/1999 |

* cited by examiner

*Primary Examiner*—Cheukfan Lee
(74) *Attorney, Agent, or Firm*—Roylance, Abrams, Berdo & Goodman, L.L.P.

(57) ABSTRACT

An image scanning device is provided including a sensor unit which carries an image sensor. The sensor unit is installed within a scanner body and is capable of reciprocating underneath a flat glass plate. The sensor unit has an image sensor and a cleaning unit arranged on a moving route of the sensor unit to remove static electricity as well as contaminants remaining on the image sensor when the cleaning unit contacts the image sensor.

10 Claims, 4 Drawing Sheets

IMAGE SCANNING DEVICE WITH CLEANING UNIT

CROSS-REFERENCE TO RELATED APPLICATIONS

This application claims the benefit of Korean Patent Application No. 2005-4132, filed on Jan. 17, 2005, the entire disclosure of which is hereby incorporated by reference.

BACKGROUND OF THE INVENTION

1. Field of the Invention

The present invention relates to an image scanning device which scans a document and outputs a scanned image corresponding to an image on the document. More particularly, the present invention relates to an image scanning device in which an image sensor is cleaned to prevent degradation of the scanned image due to contamination of the image sensor.

2. Description of the Related Art

Typically, an image scanning device is employed to scan a document and then output the scanned image to an external appliance. Additionally, an image scanning device can be incorporated in an appliance such as copy machine or multi-functional machine to instantaneously print a scanned image generated in the image scanning device and print the scanned image onto a print media.

FIG. 1 shows a multifunctional machine 100 capable of implementing an image printing function as an example of an electronic appliance which employs an image scanning device as mentioned above. FIG. 2 shows a conventional image scanning device 200. Referring to FIGS. 1 and 2, a conventional image scanning device 200 includes a scanner body 210 for supporting a flat glass plate 220 on which a document to be scanned is laid. A sensor unit 250 is installed within the scanner body 210 and is capable of reciprocating along a travel route provided underneath the flat glass plate 220. The sensor unit 250 includes a light source (not shown) for illuminating light toward the document, an image sensor 255 for reading the light L reflected from the document and generating a scan image, and a carrier 251 installed so as to reciprocate along the travel route which carries the image sensor 255. It is possible to employ any suitable image sensor such as CCD (Charge Coupled Device) or a CIS (Contact Image Sensor) as the image sensor 255. The scanned image outputted from the image sensor 255 is either outputted to the outside of the composite machine 100 or outputted to an image forming unit 150 provided within the composite machine 100 and then used for printing an image corresponding to the scanned image on a print medium P fed from a paper-feeding device 160.

One drawback of the above-mentioned device is that the incident face 256 of the image sensor 255, into which face the light reflected from the document is incident, can be contaminated. The image sensor 255 can be contaminated by external substances such as soil D (see FIG. 2) or dust. These external substances are introduced from the exterior through a connection part of each component or toner particles may leak out from the image forming unit 150 at the time of printing. In particular, in an image scanning device of the line scan type, which scans document while the sensor 250 is moving, electrostatic forces are produced by friction between the sensor unit 250 and other components when the sensor unit 250 moves. Therefore, dust and toner particles may be draw in, thereby accelerating the contamination of the image sensor. Additionally, since the image scanner 255 is positioned within the scanner body 251, it is relatively difficult to clean. Consequently, the quality of the scanned image can deteriorate due to the contamination of the image sensor.

Accordingly, there is a need for an improved image scanning device in which an image sensor can be cleaned automatically and internally to prevent a scanned image from degrading due to image sensor contamination.

SUMMARY OF THE INVENTION

An aspect of the present invention is to address at least the above problems and/or disadvantages and to provide at least the advantages described below. Accordingly, an aspect of the present invention is to provide an image scanning device in which an image sensor can be automatically cleaned, thereby preventing impairment of a scanned image from due to image sensor contamination.

In order to achieve the above-mentioned objects, there is provided an image scanning device comprising a scanner body which supports a flat glass plate on which a document to be scanned is arranged. A sensor unit is located within a scanner body and configured to reciprocate underneath the flat glass plate. The sensor unit has an image sensor and a cleaning unit arranged above a moving route of the sensor unit. The cleaning unit faces the image sensor over a portion of the moving route outside of an image scanning area to remove contaminants remaining on an incident face of the image sensor.

According to a another object the present invention, the cleaning unit may include a plurality of bristles which project from an internal wall of the scanner body and are configured to contact with the incident face of the image sensor when the cleaning unit contacts the image sensor. Additionally, the bristles may be formed from a material which is capable of being charged by static electricity from the image sensor. The cleaning unit may also include a ground member connected with the bristles to ground the static electricity charged in the image sensor.

It is also preferable that the moving route of the sensor unit comprises a first area where the sensor unit stands by when the image sensor is not driven, the image scanning area forming a second area where the document is scanned, and a third area where the image sensor is cleaned by the cleaning unit, in which the third area partially overlaps with the first area. The third area may also be interposed between the first and second areas.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
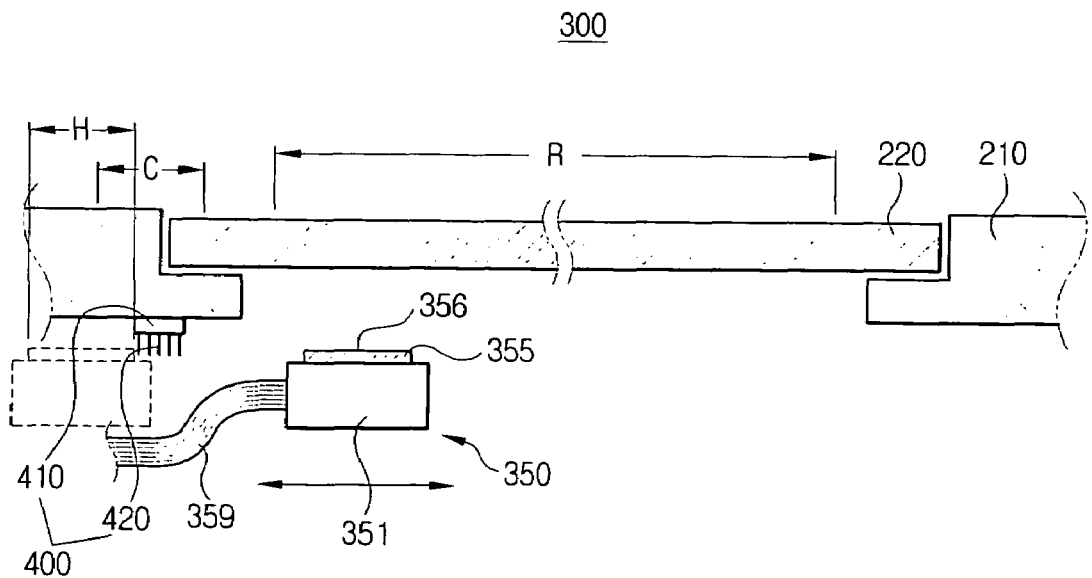
FIG. 3 shows an image scanning device according to a first embodiment of the present invention.

Referring to FIG. 3, an image scanning device according to a first embodiment of the present invention includes a scanner body 210, a sensor unit 350, and a cleaning unit 400.

Figure 1:
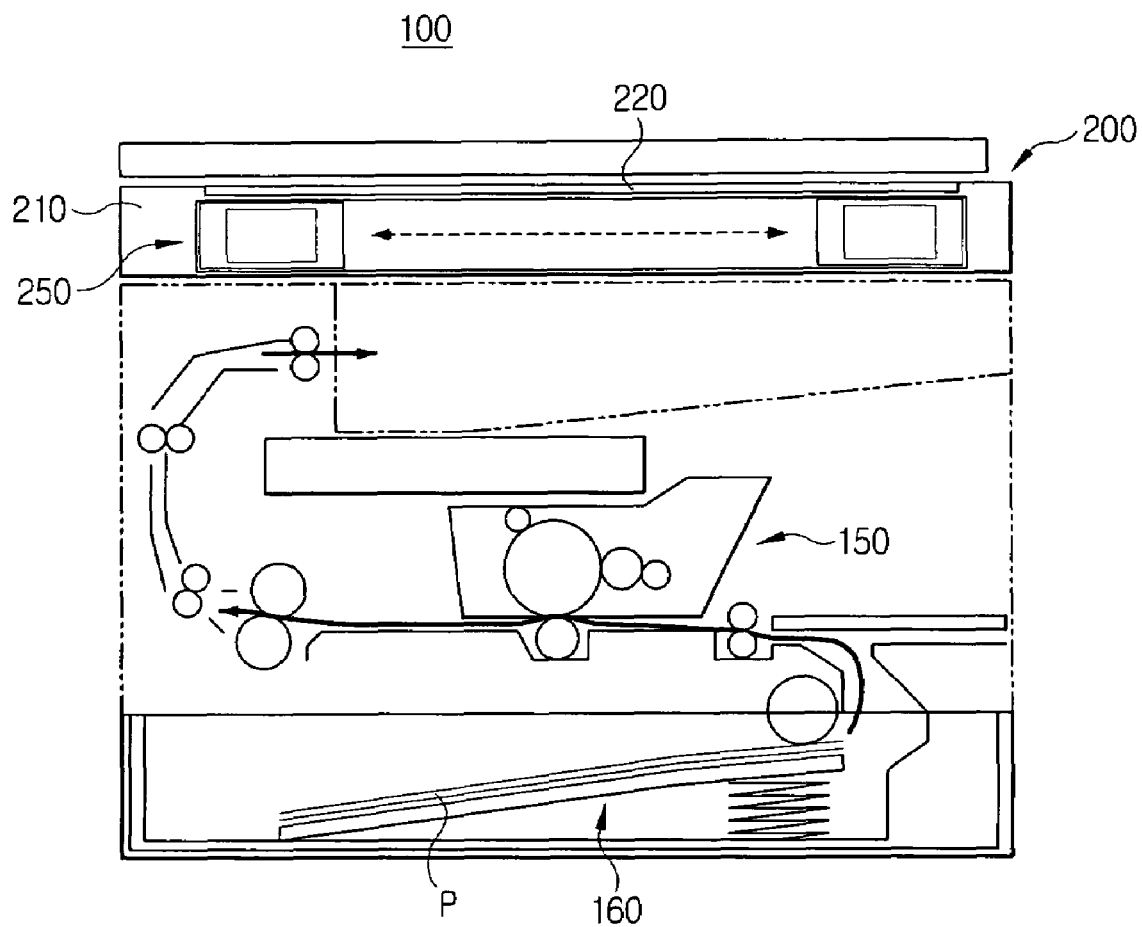
FIG. 1 shows an electronic appliance having a conventional image scanning device.
Figure 2:
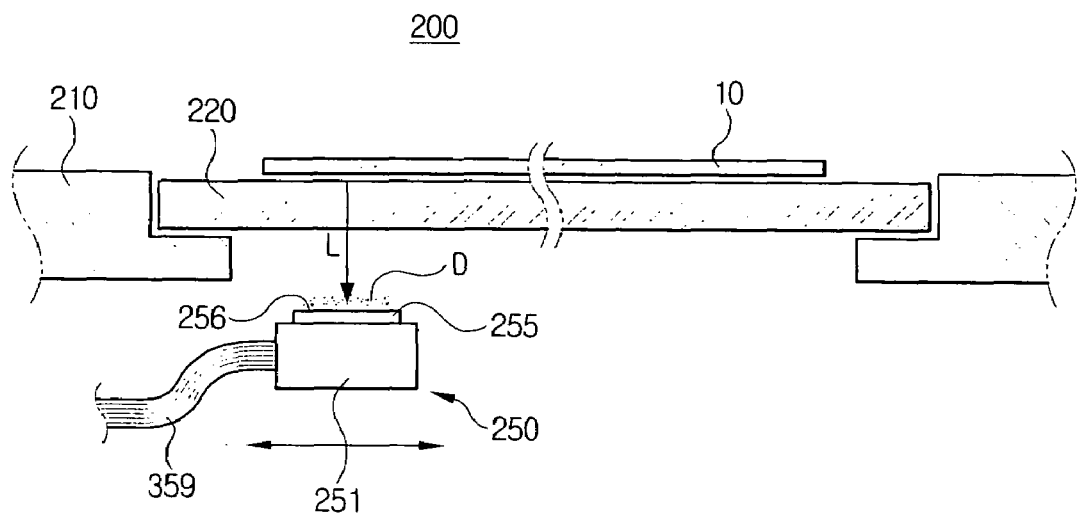
FIG. 2 shows an exploded view of the image scanning device of FIG. 1.

The scanner body 210 supports a flat glass plate 220 on which a document 10 (see FIG. 2) is arranged. In addition, various components required for scanning such a document are incorporated in the scanner body 210. For example, in a case of a composite machine, a copying machine, or a facsimile as shown in FIG. 1, the scanner body 210 forms the entire outer wall of the composite machine 100.

The sensor unit 350 includes a carrier 351 and an image sensor 355. The carrier 351 is configured to reciprocate along a moving route formed within the scanner body 210 and carries the image sensor 355. The image sensor 355 is arranged on the top of the carrier 351 opposite to the flat glass plate 220. The image sensor 355 includes an incident face 356, into which the light L (see FIG. 2) reflected from the document is incident. Although not shown in the drawing, the incident face 356 may be arranged so as to be covered and protected by a coating surface formed from a coating material or a separate protective glass. In the instant, the cleaning unit is configured to be capable of cleaning the coating surface or the protection glass. A cable 359 is provided for connecting the sensor unit 350 and the other components of the image scanning device 300 for exchanging electronic signals.

The cleaning unit 400 is provided to remove contaminants such as soil D (see FIG. 4) which contaminate the incident face 356 of the image sensor 355. The image sensor 355 may be cleaned through various methods including suction of the soil D. The cleaning unit 400 according to this embodiment includes a fixing member 410 and bristles 420. The fixing member 410 is fixed to the inner circumference surface of the scanner body 210 in such a way that the fixing member 410 is capable of contacting the image sensor 355. The fixing member 410 is located above an area of the moving route of the carrier 351 outside of the reading area R for reading the image of the document (hereinbelow, the area where the fixing member is installed in the moving route is called the "cleaning area"). The cleaning area C in the present embodiment is arranged between a standby area H where the sensor unit 350 is positioned at the time when the image scanning device 300 is idle and the reading area R. As a result, the cleaning of the image sensor 355 is automatically executed when the driving of the sensor unit 350 is starts or finishes. Due to this overlapping arrangement of the cleaning area C and the standby area H, the image sensor 355 can be cleaned when the sensor unit 350 is idle.

Figure 4:
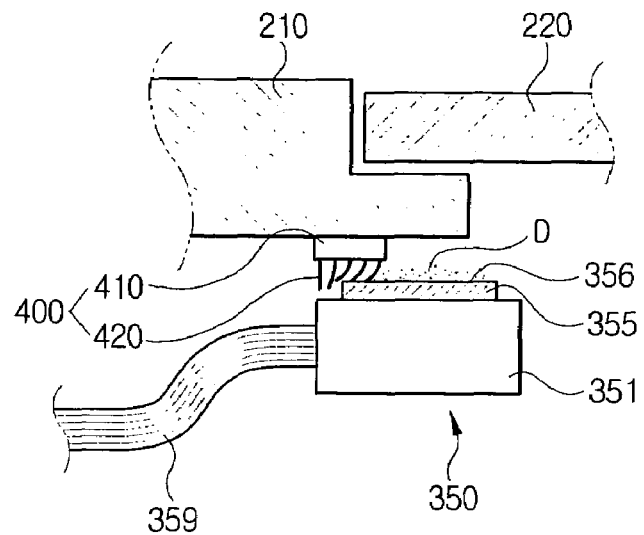
FIG. 4 shows the cleaning unit shown in FIG. 3.

Meanwhile, the bristles 420 are implanted on the bottom surface of the fixing member 410 in such a way that the tip ends thereof can come into contact with the image sensor 355. It is preferable that the bristles 420 have such a length that the tip ends of the bristles 420 are located in a position lower than that of the incident face of the image sensor 355. In addition, as illustrated in FIG. 4, the bristles 420 are preferably formed from a flexible material so as to bend along the moving direction of the image sensor 355 when contacting the image sensor 355. As such, it is possible to assure that contact between the image sensor 355 and the bristles 420 when the image sensor 355 moves, as well as to prevent the incident face 356 of the image sensor 355 from being damaged by the bristles 420.

The image scanning device 300 of the present embodiment described above is configured as a line scanning type in which the carrier 351 moves when a document is scanned. Accordingly, static electricity may be produced as the carrier 351 comes into contact with other components such as the cable 359. Static electricity may also be produced when the bristles 420 contact the image sensor 355. If the image sensor 355 is charged by the static electricity produced as described above, problems may arise in that the electromagnetic properties of the image sensor 355 may change. Therefore, vibrations and noise may be produced, and surrounding dust and toner particles can be drawn toward the image sensor 355, thereby accelerating the contamination of the image sensor 355.

Figure 5:
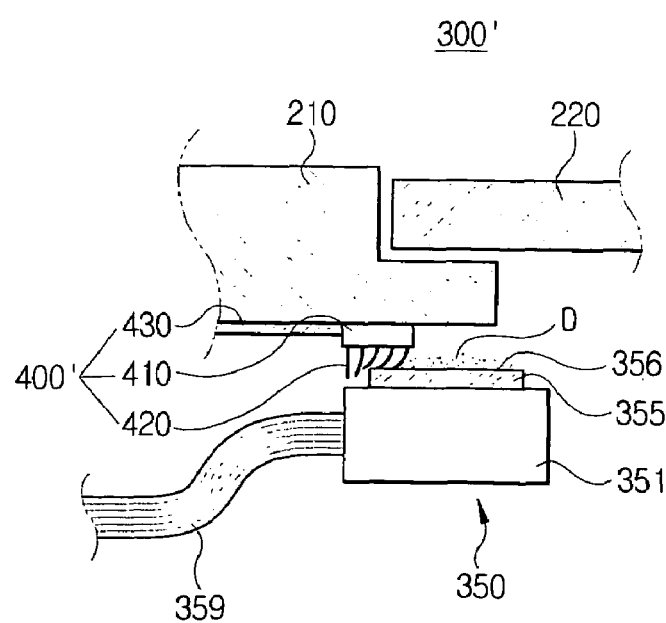
FIG. 5 shows a cleaning unit according to a second embodiment of the present invention.

FIG. 5 shows an image scanning device 300' according to a second embodiment of the present invention which can address some of the above-mentioned problems. The cleaning unit 400' further comprises a conductive member 430 for interconnecting a ground terminal (not shown) provided in the scanner body 210 and the bristles 420. Consequently, the cleaning unit 400' can also serve as a discharging unit. The conductive member 430 may be installed to be exposed outwardly of the fixing member as shown in the drawing or integrally formed within the fixing member 410 (not shown). In addition, if the fixing member 410 is formed from a conductive material, it can exhibit the functions of conductive member 430. The bristles 420 may be formed from a material configured to be charged by the static electricity charged in the image sensor 355 when contacting with the image sensor 355. Therefore, it is possible to prevent the above-mentioned problems in advance as the bristles 420 and the image sensor 355 can be grounded.

Figure 6:
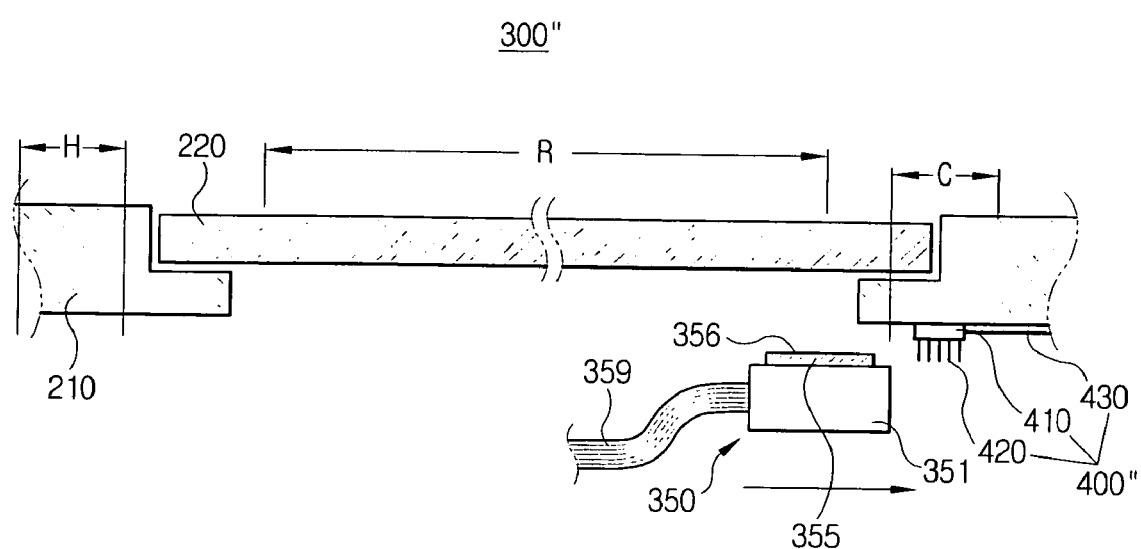
FIG. 6 shows an image scanning device according to a third embodiment of the present invention.

FIG. 6 shows an image scanning device according to a third embodiment of the present invention. Referring to the drawing, the image scanning device 300" according to the present embodiment is similar to the second embodiment in most technical aspects except that the reading area R of the cleaning unit 400" is interposed between the standby area H and the cleaning area C. If the installation position of the cleaning unit 400" is changed as described above, the sensor unit 350 moves to the cleaning area C according to the user's selection or when a previously set time period arrives, so that the cleaning and discharging of the image sensor 355 can be executed. The cleaning period can be set on the basis of the reciprocating times of the sensor unit 355 or the operating time of the sensor unit 350. According to the present embodiment, it is possible to prevent in advance the damage of the image sensor 355 caused by the repeated contact between the bristles 420 and the image sensor 355.

As described above, according to the embodiments of the present invention, the cleaning and discharging of an image sensor moving within an image scanning device can be automatically executed. Accordingly, the maintenance and management of such an image sensor can be relatively easily performed and the deterioration of scan image caused by the contamination of the image sensor can be prevented.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image scanning device comprising:
   a scanner body which supports a flat glass plate on which a document to scan is arranged;

a sensor unit, located within the scanner body, and configured to reciprocate underneath the glass plate, the sensor unit having an image sensor; and a cleaning unit arranged on a portion of a moving route of the sensor unit to face the sensor unit outside of an image scanning area to remove contaminants remaining on an outer surface of the image sensor unit;

wherein the moving route of the sensor unit comprises:

a first area where the sensor unit stands by when the image sensor is idle;

the image scanning area forms a second area where the document is scanned; and a third area where the image sensor is cleaned by the cleaning unit, the second area being disposed between the first and third areas.

2. An image scanning device as claimed in claim 1, wherein the cleaning unit includes a plurality of bristles which project from an internal wall of the scanner body to contact with an incident face of the image sensor when the cleaning unit contacts the sensor unit.

3. An image scanning device as claimed in claim 2, wherein the bristles are formed from a material which is capable of being charged by static electricity in the image sensor.

4. An image scanning device as claimed in claim 3, wherein the cleaning unit includes a ground member connected with the bristles to ground the static electricity in the image sensor.

5. An image scanning device comprising:

a scanner body which supports a flat glass plate on which a document to scan is arranged;

a sensor unit, located within the scanner body, and configured to reciprocate underneath the glass plate, the sensor unit having an image sensor; and a cleaning unit arranged on a portion of a moving route of the sensor unit to face the sensor unit outside of an image scanning area to remove contaminants remaining on an outer surface of the image sensor unit;

where in the moving route of the sensor unit comprises:

the image scanning area forming a second area; and a third area where the image sensor is cleaned by the cleaning unit, the sensor unit being movable when a user selectively positions the image sensor within the third area.

6. An image scanning device comprising:

a scanner body which supports a flat glass plate on which a document to scan is arranged;

a sensor unit, located within the scanner body, and configured to reciprocate underneath the glass plate, the sensor unit having an image sensor; and a cleaning unit arranged on a portion of a moving route of the sensor unit to face the sensor unit outside of an image scanning area to remove contaminants remaining on an outer surface of the image sensor unit;

wherein the moving route of the sensor unit comprises:

the image scanning area forming a second area; and a third area where the image sensor is cleaned by the cleaning unit, the sensor unit being movable at the time when a previously set period is reached to position the image sensor within the third area.

7. An image scanning device comprising:

a scanner body which supports a flat glass plate on which a document to scan is arranged;

a sensor unit, located within the scanner body, and configured to reciprocate underneath the flat glass plate, the sensor unit including an image sensor; and a cleaning unit, which is installed on a part of a moving route of the sensor unit to contact with the image sensor outside of an image scanning area to remove the static electricity charged in the sensor unit;

wherein the moving route of the sensor unit comprises:

a first area where the sensor unit stands by when the image sensor is idle;

the image scanning area forming a second area where the document is scanned; and a third area where the image sensor is cleaned by the cleaning unit, the second area being disposed between the first and third areas.

8. An image scanning device as claimed in claim 7, wherein the cleaning unit includes:

a plurality of bristles projecting from an internal wall of the scanner body to contact with the image sensor in which the static electricity in the image sensor is charged to the bristles when the bristles come into contact with the image sensor; and a ground member connected with the bristles to ground the static electricity charged to the bristles, and wherein the bristles brush off contaminants remaining on an incident surface of the image sensor when contacting with the image sensor.

9. An image scanning device comprising:

a scanner body which supports a flat glass plate on which a document to scan is arranged;

a sensor unit, located within the scanner body, and configured to reciprocate underneath the flat glass plate, the sensor unit including an image sensor; and a cleaning unit, which is installed on a part of a moving route of the sensor unit to contact with the image sensor outside of an image scanning area to remove the static electricity charged in the sensor unit;

wherein the moving route of the sensor unit comprises:

the image scanning area forming a second area where the document is scanned; and a third area where the image sensor is cleaned by the cleaning unit, the sensor unit being movable at the time a user selectively positions the image sensor above the third area.

10. An image scanning device comprising:

a scanner body which supports a flat glass plate on which a document to scan is arranged;

a sensor unit, located within the scanner body, and configured to reciprocate underneath the flat glass plate, the sensor unit including an image sensor; and a cleaning unit, which is installed on a part of a moving route of the sensor unit to contact with the image sensor outside of an image scanning area to remove the static electricity charged in the sensor unit;

wherein the moving route of the sensor unit comprises:

the image scanning area forming a second area where the document is scanned; and a third area where the image sensor is cleaned by the cleaning unit, the sensor unit being movable at the time when a previously set period is reached to position the image sensor above the third area.

* * * * *

UNITED STATES PATENT AND TRADEMARK OFFICE
CERTIFICATE OF CORRECTION

PATENT NO. : 7,593,146 B2 Page 1 of 1
APPLICATION NO. : 11/320317
DATED : September 22, 2009
INVENTOR(S) : Choi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Twenty-first Day of September, 2010

David J. Kappos
*Director of the United States Patent and Trademark Office*